United States Patent
Tan et al.

[11] Patent Number: 5,917,493
[45] Date of Patent: *Jun. 29, 1999

[54] METHOD AND APPARATUS FOR RANDOMLY GENERATING INFORMATION FOR SUBSEQUENT CORRELATING

[75] Inventors: Jin-Meng Tan; Beng Hong Kang, both of Singapore, Singapore

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/633,614

[22] Filed: Apr. 17, 1996

[51] Int. Cl.⁶ .................................................. G06T 1/00
[52] U.S. Cl. ..................... 345/358; 345/348; 707/541; 707/539
[58] Field of Search .................................. 395/804, 358, 395/776, 778; 345/173, 358, 335, 348; 707/541, 514, 516, 525, 539

[56] References Cited

U.S. PATENT DOCUMENTS

| | | | |
|---|---|---|---|
| 5,398,310 | 3/1995 | Tchao et al. | 395/804 |
| 5,404,442 | 4/1995 | Foster et al. | 395/348 |
| 5,446,882 | 8/1995 | Capps et al. | 395/615 |
| 5,457,476 | 10/1995 | Jenson | 345/146 |
| 5,539,427 | 7/1996 | Bricklin et al. | 345/118 |
| 5,544,358 | 8/1996 | Capps et al. | 395/785 |
| 5,559,942 | 9/1996 | Gough et al. | 395/349 |
| 5,563,996 | 10/1996 | Tchao | 395/783 |
| 5,581,681 | 12/1996 | Tchao et al. | 395/804 |
| 5,590,256 | 12/1996 | Tchao et al. | 395/787 |
| 5,625,377 | 4/1997 | Jenson | 345/146 |

*Primary Examiner*—Joseph H. Feild

[57] ABSTRACT

A method and apparatus for manipulating data entries on a screen of a computer display is provided. Random data entries are allowed on pages of a dedicated application program in real time. A "capture now, organize later" functionality is implemented. The dedicated application program is used to capture "pages" of notes which form individual data sets. Drag-and-drop functionality is provided for organizing pages post creation by making other application programs compatible with receiving and retaining the captured data sets. Once a data set "page" is discarded or used to "stick" the data into another application, it is deleted from the dedicated application program and the remaining data sets are reordered sequentially.

21 Claims, 9 Drawing Sheets

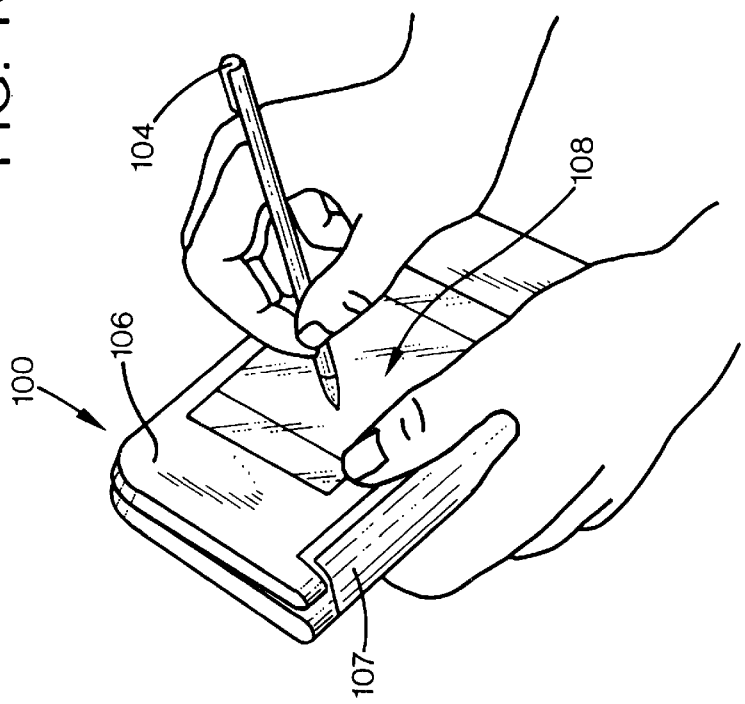
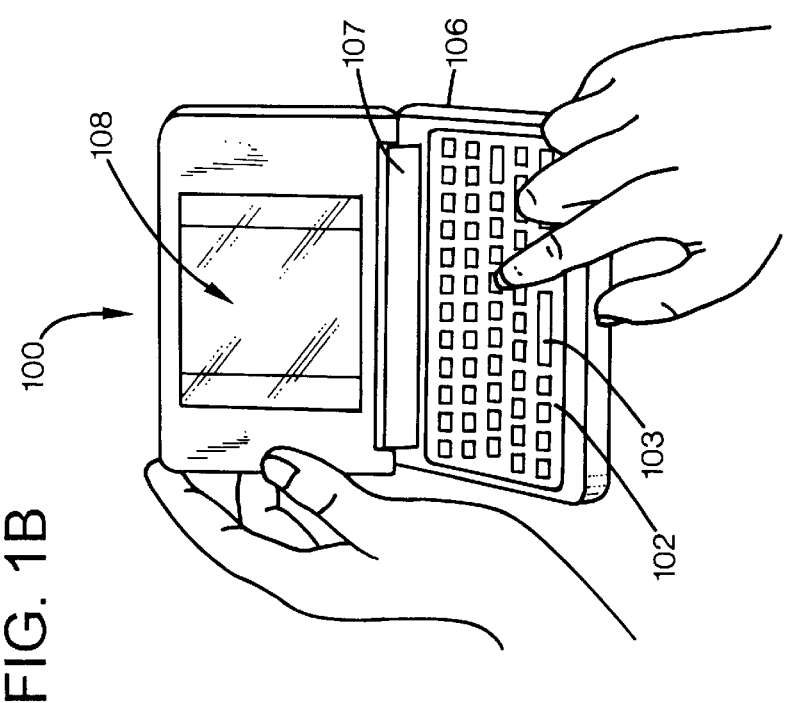

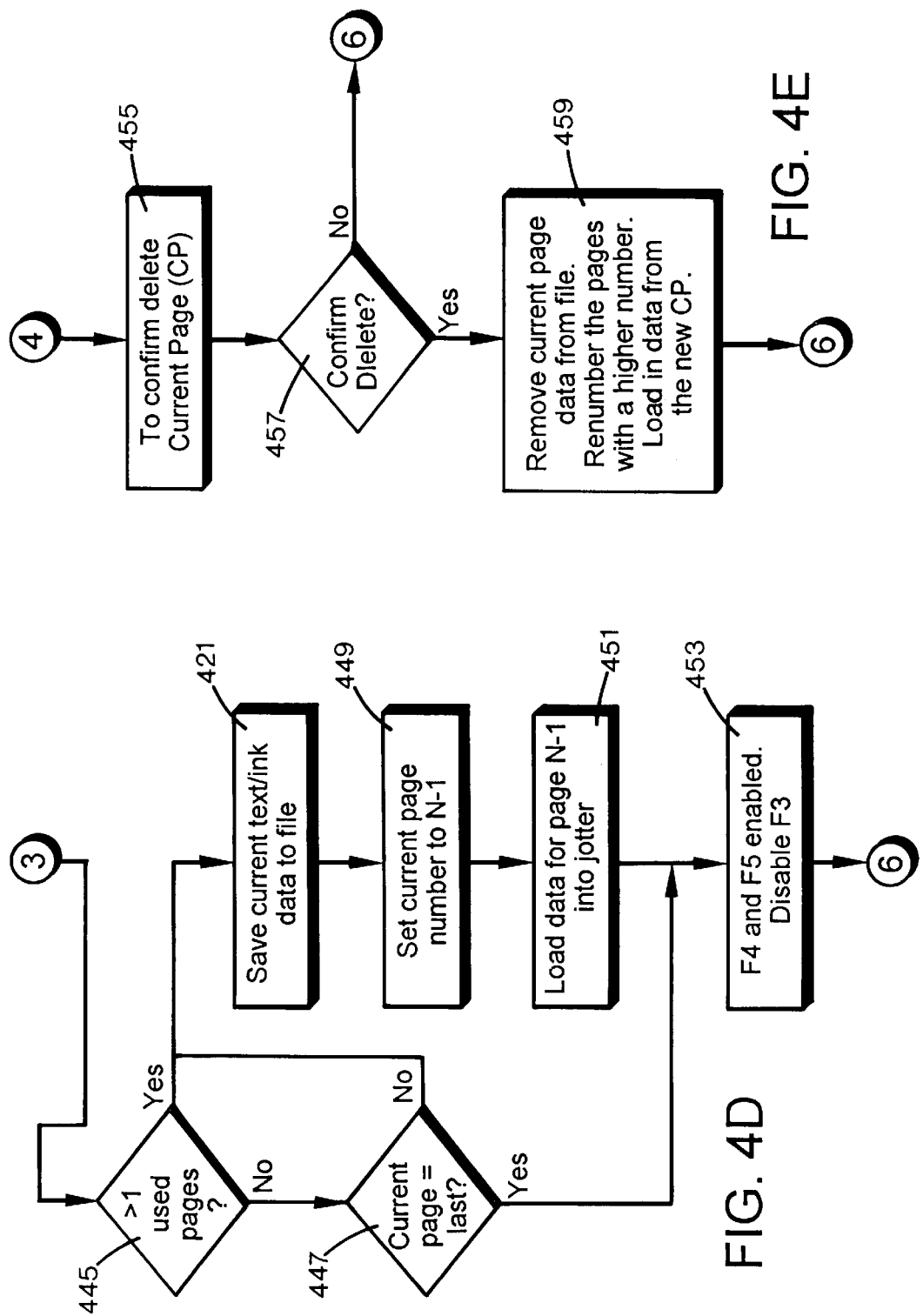

METHOD AND APPARATUS FOR RANDOMLY GENERATING INFORMATION FOR SUBSEQUENT CORRELATING

BACKGROUND OF THE INVENTION

1. Field of the Invention

The present invention relates generally to data storage, more particularly to data entry and compilation and specifically to a stylus input device based computer, having a method for the random capture of information for later organization.

2. Description of Related Art

As shown in FIGS. 1A, 1B and 1C, "pen-input based" computer systems, sometimes referred to as "palmtops," are small, hand-held computing apparatus 100. One such apparatus is the OMNIGO™ computer by Hewlett-Packard Company. While a keypad 102 is provided, having a set of alphanumeric and function keys 103 (FIGS. 1A and 1B only) for program control and data entry and manipulation, generally a primary means for inputting data in a palmtop computer is a hand-manipulated stylus, or "pen," 104, configured as a gesture implemented data manipulation device. Handwriting recognition based on stylus input to a "touchscreen" is well known to persons skilled in the art. The pen 104 can be carried in a holster 105 as shown in FIG. 1A, and is removed from the holster 105 by pulling in the direction of the representative arrow in the drawing. The palmtop apparatus housing 106 folds via a hinge mechanism 107 from a closed position for easy transportation (preferably palmtops are pocket-sized), to a desktop type position as shown in FIGS. 1A and 1B, to a fully open position as shown in FIG. 1C.

A dual function display 108, such as an LCD touchscreen as would be known in the art, is provided to serve as both an input device and an output device. When operating as an input device, the display exhibits either keypad 102 entries as shown in FIG. 1B or the positioning of the tip of the stylus 104 on the display 108 as shown in FIG. 1C. The data entered in either manner is routed via the apparatus' internal, central processing unit ("CPU" such as a commercially available VG-230™ by VADEM™—not shown) and memory (not shown) as would also be known in the art. When operating as an output device, the display 108 presents computer generated images on its central data screen section 109 (hereinafter "screen 109"), FIG. 2, based upon the user input. With touchscreen capability, the display 108 can also be used for quick program access. Icons 1–12 in the display 108 side perimeters 201 are provided which when touched with the stylus 104 (FIGS. 1A, 1B, and 1C) activate, "boot-up," the requested application program. One of the icons, 1 Home screen, is used to bring up application icons that are not in the screen side perimeters 201 onto the central data screen section 109.

The CPU is programmed to recognize both alphanumeric characters and graphical images created on the display 108 with the keys 103 and with the stylus 104. Thus, the user is provided with a convenient, multifunctional, computing apparatus which also has ports (not shown) for transferring information to a printer or a host computer. In other words, the user may be working with the keypad 102 to run a built-in, sophisticated, spreadsheet program at a leisurely pace, or the user may wish to scribble in a quick reminder note or sketch with the stylus 104.

While versatile and easy to use, a problem with such notepad computing convenience is that data entry, particularly with the stylus 104 is randomly input. For example, the user may be at a meeting where a variety of issues are being discussed that are traditionally stored in various other programs, such as the spreadsheet 8, one of the databases 5, in the appointment book, or the like. In such situations, real time data entry into each application can become too complicated to keep up with the meeting, rendering the usefulness of the apparatus less than an optimal.

One method for creating pen generated notes is shown in U.S. Pat. No. 5,398,310 to Tchao et al. for a Pointing Gesture Based Computer Note Pad Paging and Scrolling Interface. Tchao shows a method for creating notes which can be segregated by drawing a line across the screen 38, creating a new header for the following entry. Entry continues in that note until another line is drawn across the screen, creating a new header for the next following entry. A limitation of the Tchao methodology is that one must scroll through the notes sequentially. Another limitation is that other than keeping the notes entered, there is no means of transferring the notes to other applications.

Thus, there is a need for a random entry and random access method and apparatus for randomly generating information for subsequent correlating to other resident applications.

SUMMARY OF THE INVENTION

A computer is provided with a system for randomly generating information for subsequent organization. Such a system comprises a series of application programs and a screen. Of the application programs, at least one contains a field that is capable of accepting data. An application program for randomly generating on the screen computer images, which provide information to a user, is also provided. The computer-generated images are arranged in a paginal order in such an application program and are presented to the user as pages of information. When one computer-generated image is selected and subsequently removed, the rest of the images are re-arranged in a new paginal order. An icon depicting the selected image is then provided on the screen, and if the icon is correlated with the data-accepting field, the selected image is transferred to such a field.

The present invention further provides for a memory device having an embedded program application in accordance with the methodology of these steps.

It is an advantage of the present invention that it provides a method for random entry of differing forms of data in data sets that can later be transferred to other relevant applications, thereby allowing a "capture first, organize later" operation philosophy valuable in hectic business situations.

It is another advantage of the present invention that it automatically re-correlates remaining sets of data when any one set of a series is transferred to another application, thereby eliminating scrolling through blanked entries.

It is yet another advantage of the present invention that it caters to a user model of entering and organizing note-like information throughout an integrated system in a way that is intuitive and natural to the user.

It is a further advantage of the present invention that it employs stylus based drag-and-drop data transfer to facilitate fast data manipulation.

Other objects, features and advantages of the present invention will become apparent upon consideration of the following explanation and the accompanying drawings, in which like reference designations represent like features throughout the drawings.

BRIEF DESCRIPTION OF THE DRAWINGS

FIGS. 1A, 1B, 1C are perspective depictions of a palmtop computing apparatus in accordance with the present invention in which:

FIG. 1A shows the apparatus open with a stylus partially withdrawn from its holster;

FIG. 1B shows the apparatus of FIG. 1A as being used for data entry using its keypad; and FIG. 1C shows the apparatus fully opened and being used fro data entry using the stylus.

FIGS. 4A, 4B, 4C is a flow chart for the methodology in accordance with the present invention in which:

FIG. 4A is a flow chart showing the initial turn-on routine for the JOTTER application, FIG. 4B is a flow chart showing the steps of a new data input routine for the JOTTER application, FIG. 4C is a flow chart showing the steps of a routine for the JOTTER application for function key operations implementing page changes, FIG. 4D is a flow chart showing the steps of a routine for the JOTTER application function key to move from a current page to the first used page, FIG. 4E is a flow chart showing the steps of a routine for the JOTTER application function key to discard a current used page.

The drawings referred to in this specification should be understood as not being drawn to scale except if specifically noted.

DESCRIPTION OF THE PREFERRED EMBODIMENT

Reference is made now in detail to a specific embodiment of the present invention, which illustrates the best mode presently contemplated by the inventor(s) for practicing the invention. Alternative embodiments are also briefly described as applicable.

Figure 1A:
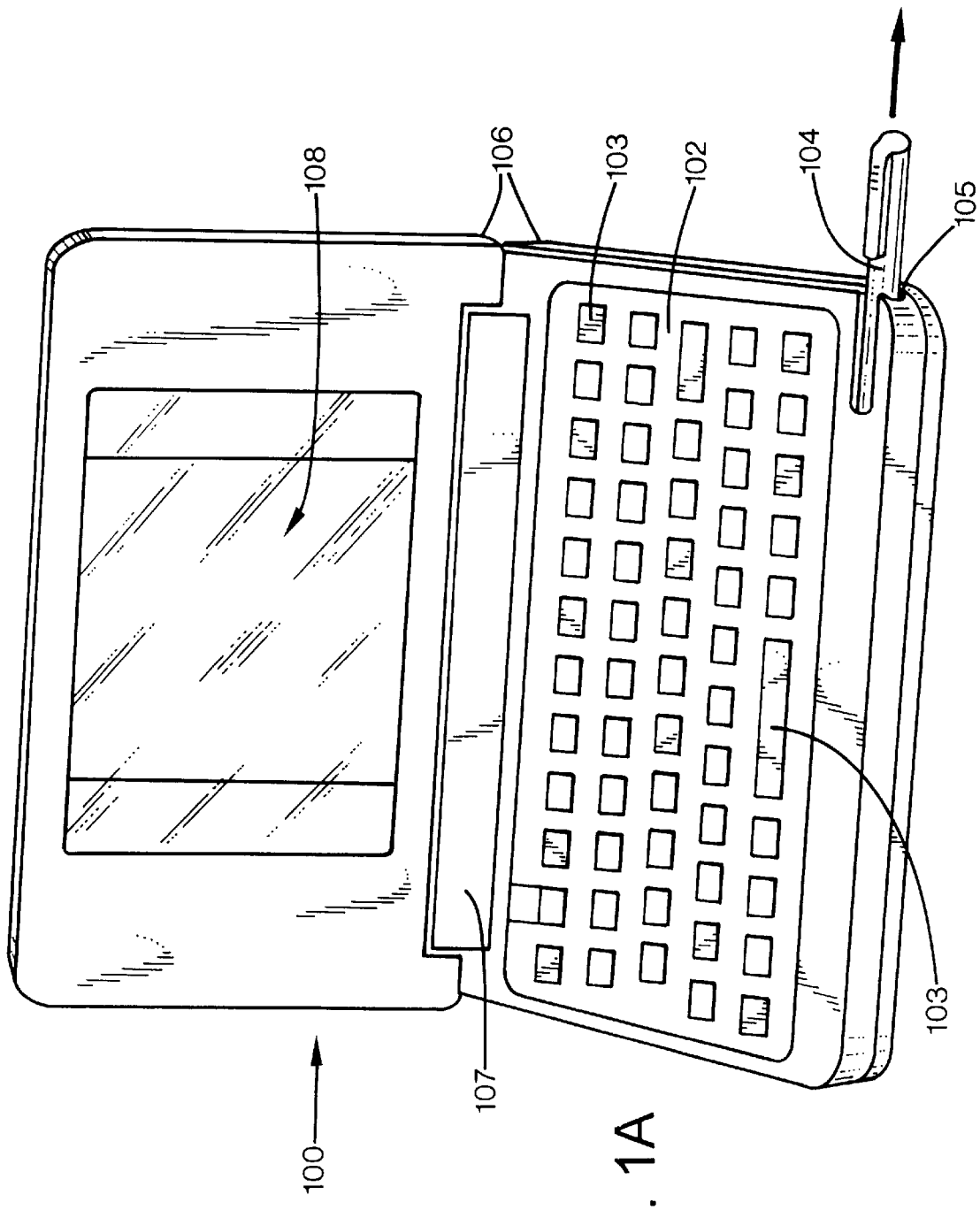
Figure 2:
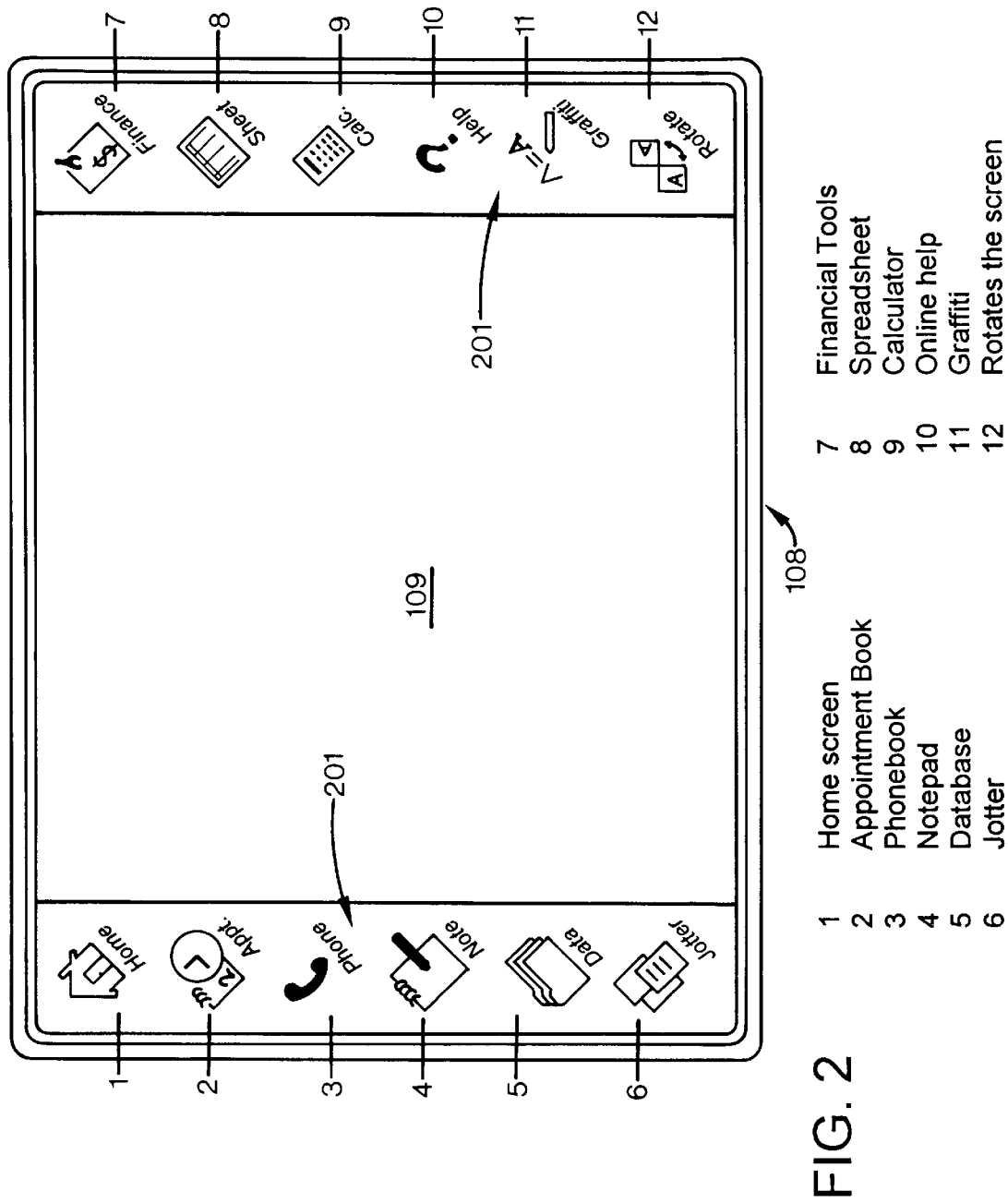
FIG. 2 is a two dimensional depiction of the display device of the apparatus as shown in FIGS. 1A, 1B and 1C.

As shown in FIG. 2, a plurality of resident applications are provided in the CPU and memory of the hand held computing apparatus 100. Each application is accessed by tapping its touch sensitive icon 1–12 with the tip of the stylus 104. Some routines are merely apparatus utilities such as "Home screen"/icon 1 which boots up a main program manager; "Online help"/icon 2 which boots up help screens during applications; "Calculator/icon 9; "Graffiti"/icon 11 which is used to preset handwriting recognition patterns; and "Rotates the screen"/icon 12 which changes the data entry screen orientation ninety degrees as shown in FIG. 1C. Note that the keypad 102 (FIGS. 1A and 1B) also includes dedicated keys for each of the built-in applications for one-touch keypad booting rather than stylus "tap and activate" entries. The non-utility program applications, icons 2–8, are interactive; that is, data can be transferred between the applications.

An application specific to the disclosure of the present invention is stored in fixed memory, such as a read only memory (ROM) integrated circuit device (memory devices such as integrated circuits, flash memory, hard disks, floppy disks, laser compact disks, and the like, are well known in the art; further explanation is not necessary to an understanding of the present invention and the term "memory" should be understood to represent any such apparatus as would be justified as a design expedient for a particular implementation of the present invention without limitation as to the claims hereinafter). The specific application of interest is referred to hereinafter as "JOTTER", represented by an touch sensitive icon 6 in the lower left corner of the display 108. When the tip of the stylus 104 is touched to the JOTTER icon 6, the JOTTER application of the present invention is booted up.

The JOTTER application is a focal point for other applications; in other words, it is a locus for entry of data in a rapid manner for later organization. That is, the user may be receiving information which in real-time he cannot rapidly organize in an intelligent manner. The present invention functions to allow data capture now and organization later. Namely, data entered using the JOTTER application as described hereinafter can have a logical destination application, e.g., time and date data for an Appointment Book application, icon 2, to which the data can be moved at a convenient time.

The functional operation of the JOTTER application is to allow the quick capture of information by keypad 102 entries or in "ink"—that is, by the use of the stylus 104 in a hand writing recognition mode on the display 108 wherein sensing by the CPU of the position of the tip of the stylus on the screen 109 and its positional movement across the screen 109 generates a corresponding image on the screen to create the illusion that the stylus 104 is a "pen" drawing the image directly on the screen 109.

The application is started by touching a dedicated function key 103 or the tip of the stylus 104 to the JOTTER icon 6 in the display side perimeter 201. The JOTTER application in accordance with the present invention is a multi-page (e.g., 20 pages) electronic notepad. Each page can contain alphanumeric text, graphical images, or both. Information entered into the JOTTER application can be saved and later transferred to any other application that can have note or table as will be explained in detail hereinafter. The JOTTER application methodology allows multi-page, quick capture of information using the stylus 104 or the keypad 102. After capturing the information, the user transfers it to another application or discards those notes that are no longer required. Information is captured in a first in, last out, "stack" of virtual pages, where page one (1) is at the bottom of the stack and the most recently entered data page, e.g., page eleven (11), is at the top of the stack. In the commercial embodiment of the HP OMNIGO computer, twenty (20) pages are permitted.

The operation in accordance with the present invention will now be described in conjunction with continual reference to FIGS. 3 and 4A–F. To repeat, the application is started by touching the tip of the stylus 104 to the JOTTER icon 6 in the display side perimeter 201 or tapping a dedicated JOTTER key. This will bring up the application, represented by step 401 in FIG. 4A.

Figure 3:
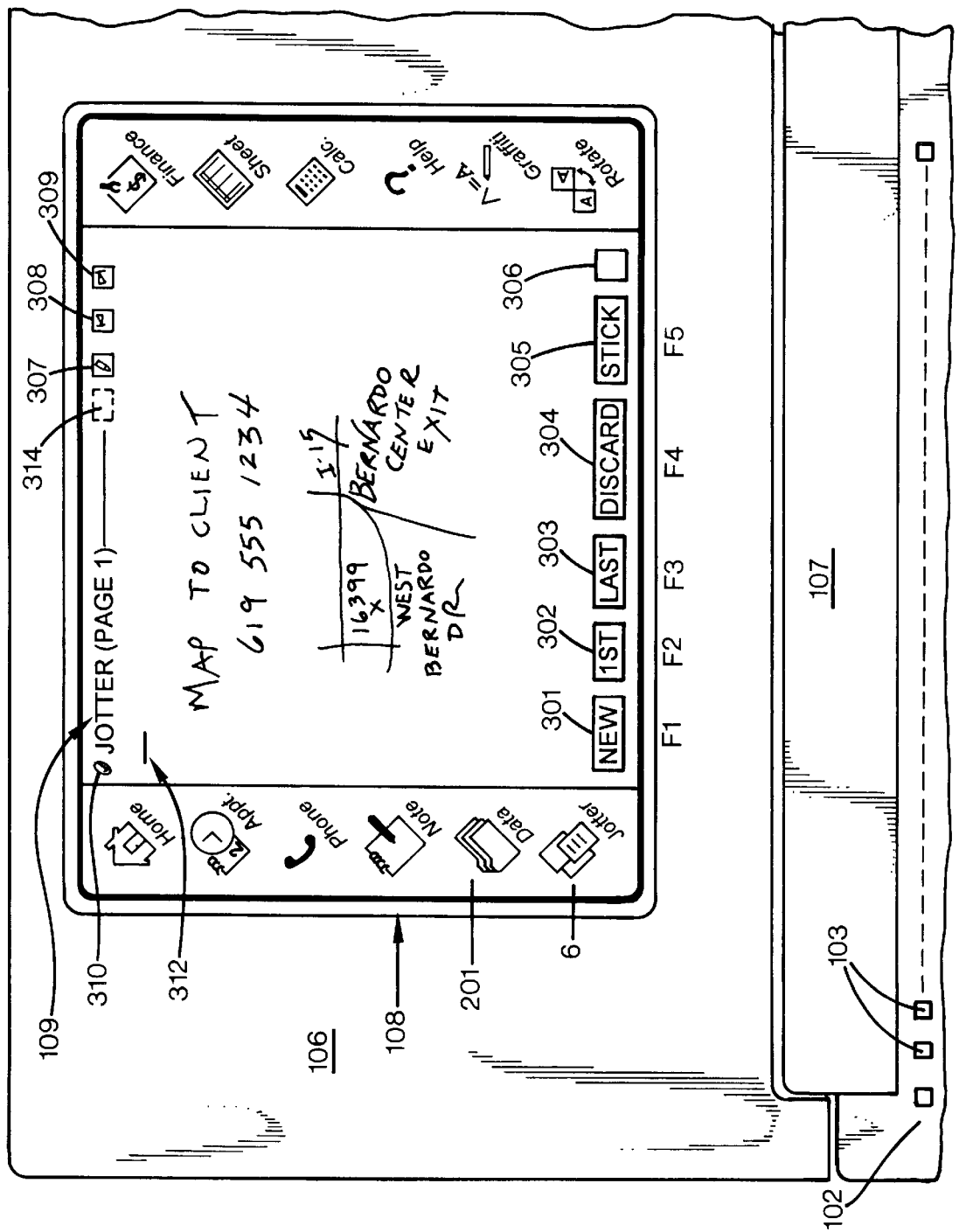
FIG. 3 is a two dimensional depiction of the apparatus with a central data screen section of the display showing an exemplary mode of operation in accordance with the present invention.

The housing 106 portion that contains the display 108 is labeled, F1, F2, F3, F4, and F5, beneath the screen 109 as shown in FIG. 3 only. The JOTTER application provides virtual function keys 301 (NEW), 302 (FIRST), 303 (LAST), 304 (DISCARD), and 305 (STICK) across the bottom of the screen 109 in respective proximity to the labels F1 through F5 for use with the stylus 104. A set of actual function keys 103 are provided as part of the keypad 102. The redundant virtual function keys 301–305 permit stylus access rather than requiring a switch to the keypad 102 which might be awkward, for example, if the apparatus 100 is being used as shown in FIG. 1C.

An additional virtual key 306 provides access to a pop-up application menu of editing and printing task commands, providing use of such well known screen editing actions as CUT, COPY, PASTE, DELETE, PRINT SCREEN, or the like.

Other function keypad keys 103 are provided and also duplicated with virtual keys. Across the top of the screen 109 is a title bar showing the active application name, JOTTER, its current page number (PAGE #), a pen mode select virtual key 307 which pops up a menu of stylus 104 functions (such as WRITE TEXT, DRAW INK, ERASE INK, SELECT INK, or the like—where "SELECT" means a boundary can be drawn around some entry on the screen in order to make it the object of a CUT, COPY, DELETE, or the like, operation from the screen editing utility) as would be known to a person skilled in the art and about which further detail is not necessary to the understanding of the present invention. The pen mode key 307 icon will change to an image that reflects the status of the pen mode currently selected by the user. Generally, the stylus 104 can only be in one mode at a time; for instance, if the stylus 104 is in a WRITE mode, a handwriting recognition mode is activated and text can be written and recognized but other modes, ERASE, DRAW, SELECT, are disabled.

Two horizontal page change virtual keys 308, 309 are provided to allow the user to go to the previous or the next JOTTER page; JOTTER employs "wrapping" and, thus, pressing the next page key 309 while on the last used page moves to the first used page. To the left of the title bar is a virtual key 310 which closes the JOTTER application.

The first time that the application is started, it will bring up a blank page if one is available; if not, the last page, e.g. page 20, will be displayed. Thus, in step 403, a data file is opened, that is a section of memory is initialized and designated for displaying data present in it, if any, and storing new data entered; the apparatus initializes and designates a handwriting recognition mode of operation; and a text cursor, _ 312, appears on the beginning of the first text line. If some, but not all, pages have been used, the application will always bring up the page that was last used, with the stylus input mode activated, and with the text cursor position in the same position as when the last input was entered.

In the next step 405, the application sets a flag to record user modifications to a current page or when a stuck page (explained in detail hereinafter) is newly created or deleted by a destination non-utility application program, e.g. a calendar-type application. As would be well known in the art of integrated circuit data manipulation, this task can be implemented in a number of ways; most commonly, input/output registers, accumulators, or buffer circuitry associated with the display 108, act as a pipeline between a random access memory and the keypad 102 or stylus 104 actions. simple user request input is the use of the page change virtual keys 308, 309. Left and right facing arrow icons are provided to step through used pages; by used pages, is meant pages in which data is presently held; the displayed page is considered "used" when any mark, "ink," albeit even a single dot or line, exists (entry of tabs or spaces alone are not printable and therefore if a page contains only tab or space characters, it is considered "unused"). For example, assume there are three used pages. Tap the left page change virtual key 308 and the application will go from displaying the current page to the next previous used page. In other words, if the current page is page 2, tapping the left page change virtual key 308 takes the application to used page 1 which is then displayed on the screen 109. If the current page is page 1, tapping the left page change virtual key 308 will take the application to the last used page. Similarly, tapping the right page change virtual key 309 will take the application to the next sequentially used page. In other words, if the current page is page 2, tapping the right page change virtual key 309 takes the application to used page 3. Likewise, if the current page is the last page, page 20 in the exemplary embodiment, tapping the right page change virtual key 309 will take the application to used page 1. Note that if only pages 1,2 and 3 are used, and the user being on used page 3 taps the right page change virtual key 309, the application wraps to page 1 because it is the next used page. Again, as previously noted, dedicated keys 103 for page changing, e.g., labeled PREV, NEXT, or the like, are provided as part of the keypad 102 for users who prefer keypad use over stylus use at any particular time.

In order to omit the need for scrolling through pages sequentially, the application will recollate used pages by "shifting left" as needed. That is, if pages numbered 1, 2, 3 and 4 are used, and page 3 is discarded (as will be explained hereinafter), the data on used page 4 is automatically moved to page 3 and page 4 becomes available for reuse. In this manner, used pages are always contiguous; that is, the present invention does not require the user to step, or scroll, through blank pages. This may also be thought of as a stack of notes where if one is pulled from the stack, those below rise toward the top, viz., toward used page number 1.

Figure 4A:
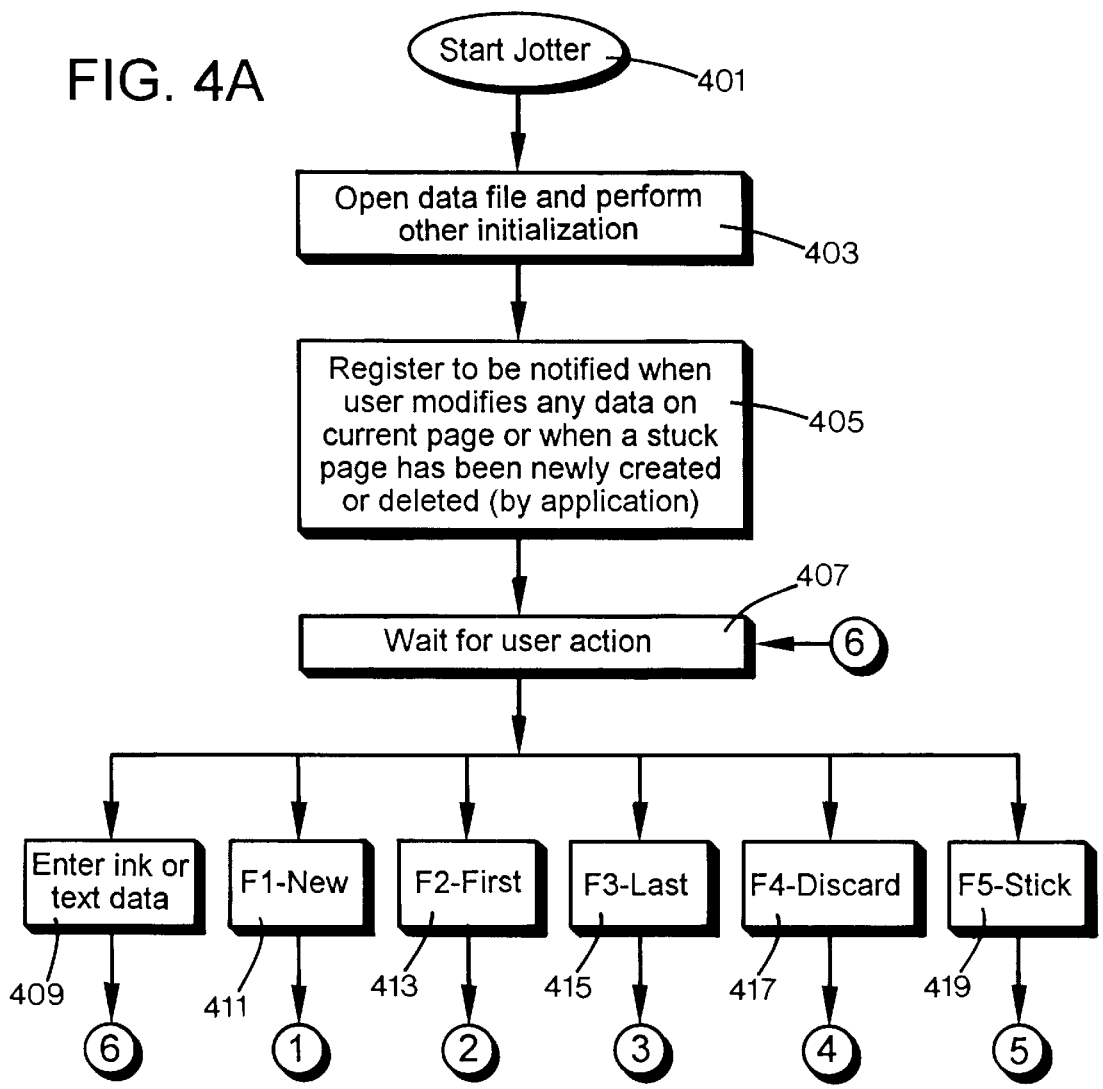

Returning to the flow chart of FIG. 4A, assume that the apparatus has been turned on, the JOTTER application selected, step 401, that the most recently used page has appeared on the screen, step 403, and all registers/buffers are set, step 405. The application enters a wait state 407 for user input. In general, except when executing another function, the application returns to the wait state 407.

Other than searching for a particular used page as just described, the logical next use is data input, step 409. Data can be input using the keypad 102 as shown in FIG. 1B, namely by typing alphanumeric characters which will appear sequentially as the cursor 312 moves across the screen as with any typical computing keyboard entry system. Alternatively, data can be input using the stylus 104. In the example shown on screen 109 in FIG. 3, the user records a map and phone number of a client. Initialization has by default put the stylus 104 in the handwriting recognition mode, DRAW INK. Therefore, the user can scrawl "MAP TO CLIENT 619 555 1234" across the screen as shown. Next, wishing to draw the map, the user taps the mode virtual key 307; stylus mode selections appear on screen as a pop-up menu; and the user taps the icon or text to enable a graphics mode, e.g., a DRAW INK selection or the like. ERASE INK, a non-graphics mode, or SELECT INK, a momentary graphics mode operation to enclose "INK" and recognize it for an editing operation are similary used. The pop-up menu vanishes and the stylus mode virtual key 307 changes its icon to reflect the new mode. The user then draws lines to represent streets and intersections. Wishing to label the streets and intersections, the user again taps the stylus mode virtual key 307 and changes back to the handwriting recognition mode by tapping the appropriate icon or its help text on the same pop-up menu, e.g., a "[!] WRITE TEXT" menu selection or the like. Again, the pop-up menu disappears and the stylus node virtual key 307 changes to the icon [!] to reflect the handwriting recognition mode. The user then prints the labels shown in FIG. 3, "16399—X—WEST BERNARDO DR—I 15—and BERNARDO CENTER EXIT" with the stylus 104.

To continue the exemplary operation in accordance with the present invention, assume that the user has finished entering data for page 1 and stops; the application returns to the wait state 407. Assume the user next wishes to start a new page with a list of things to do for the client prior to following the map to visit the client. Using either the dedicated keypad F1 key or virtual function F1 key 301, NEW, with the stylus 104, as represented in step 411, a blank page is brought up on the screen 109 in accordance with the steps of FIG. 1B. More data can be entered accordingly.

Note that the user could select another operation 413, 415, 417, 419, with the other dedicated function keys F2–F5, virtual keys 302–305, respectively. Details as to those operations follow hereinafter. Having selected function key F1/301 NEW, step 411, the application takes the step 421 of automatically saving the current text/drawing data to a page file in random access memory, where N is set as the total number of used pages, thus if the current used page is page 1, set N=1, step 423. The entered text/drawing data is cleared from the screen 109 (annotated in the flow chart as "UI" for "user interface") and the title bar is changed to "JOTTER (page #N+1)" for the new page in which data can be entered, step 425. For example, if the current used page is PAGE 3, the NEW page will be PAGE 4. Since the screen is blank at this point, the DISCARD and STICK function keys F4/304 and F5/305 are disabled, step 427. The application again returns to the wait state 407. Selecting the F1/301, NEW, key has no effect if the current page does not contain any data, step 429. If all pages have been used, step 431, including the current page, the F1/301, NEW, key is disabled, step 433. As is common to graphical user interface ("GUI") techniques, changing the color or shading of the virtual keys from a standard operational shading or color indicates disablement.

A NEW page becomes a used page when it contains some text or drawing. Used pages are numbered sequentially, with PAGE 1 being the oldest page. Editing or modifying data on a used page (described in detail hereinafter) does not alter its page number.

Figure 4C:
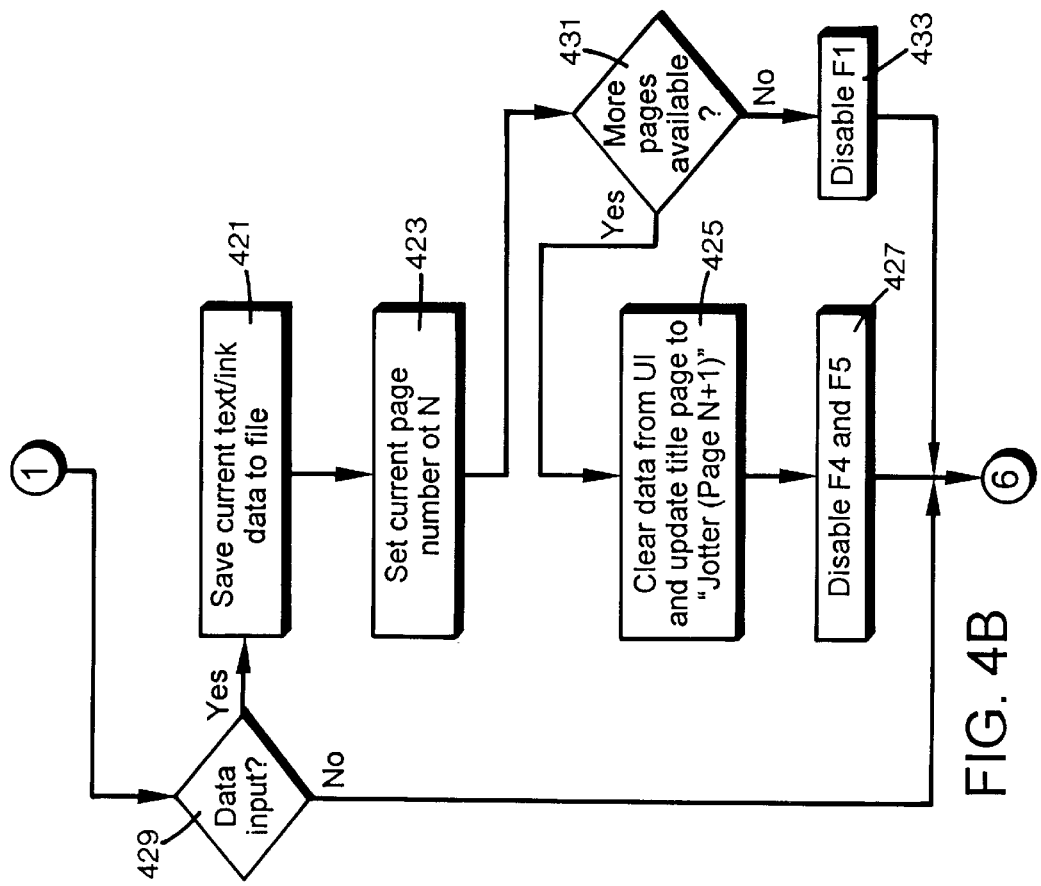
Figure 4B:
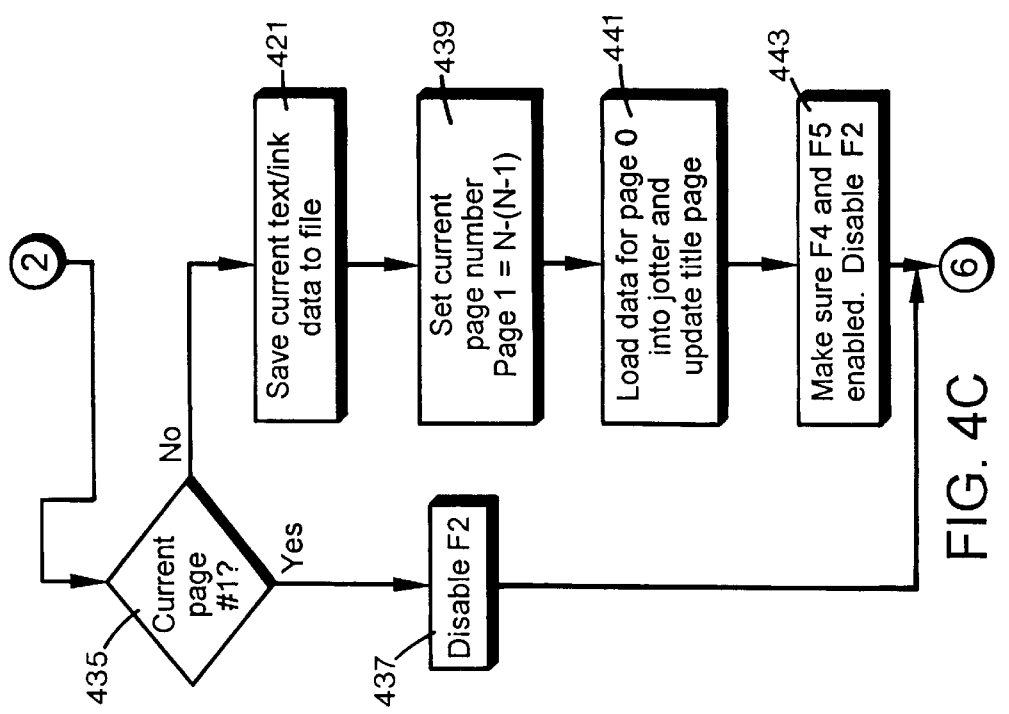

At anytime during operation, the user can use the F2/302, FIRST, or F3/303, LAST, function keys. Tapping these keys takes the application to the first or last page that contains data. The F2/302, FIRST, function key routine, step 413, is shown in FIG. 4C. If the current page is PAGE 1 step 435, the F2/302, FIRST, key is disabled, step 437. Assuming the current used page is not PAGE 1 as with the F1/301, NEW, function key, the first step 421' is to save the text/drawing data to a page file in memory. In the next step 439, the current page number is set for PAGE 1 i.e., PAGE 1=N−(N−1), where "N" is the current page number. Data is then loaded from memory into the screen 109 buffers and displayed, with the title bar being updated to show "JOTTER (PAGE 1)", step 441. Function keys F4/304 and F5/305 are enabled for use, step 443. Again, the application returns to the wait state 407.

Use of the F3/303, LAST, function key, step 415 as shown in FIG. 4D, is very similar to the F2/302, FIRST, function key routine. Note that the F2/302 key is disabled under two conditions: (1) there is only one used page, step 445, or (2) the current page is the last used page, i.e., the highest in the stack of used pages, step 447. Step one, 421", of the LAST routine is to save the current used page to a file in memory. To jump to the last used page, the called up current page will be page N−1 step 449. Data will be transferred from memory for page N−1 to the screen, step 451. The F4/304, DISCARD, and F5/305, STICK, keys are enabled and, since the application is now at the last used page, F3/303, LAST, is disabled, step 453. The wait state 407 is again entered.

Whenever a used page is on the screen 109, the F4/304, DISCARD, and F5/305, STICK, keys are enabled, see steps 417 and 419. FIG. 4E shows the DISCARD routine. This routine is used to delete the entire current used page. Tapping the F5/305, DISCARD, key pops up a dialog box, step 455, which, in the typical computer mannerism, gives the user the chance to confirm that the current page is to be discarded, step 457, or to cancel the request. If the user changes his mind, he cancels the request and the application returns to the wait state 407; otherwise, the DISCARD command is reaffirmed. Once reaffirmed, the current used page is removed from memory, pages with a number higher than the current page decrement by one; viz., if N=7, and the current used page is number 3, being discarded, used page 7 becomes the new used page 6, used page 6 becomes the new used page 5, used page 5 becomes the new used page 4, and used page 4 becomes the current used page 3 which is transferred from memory to the screen 109—step 459. If the only used page is PAGE 1 and it is discarded, a NEW page="JOTTER (PAGE 1)" is presented on the screen 109. Again, the application goes to the wait state 407.

Figure 4F:
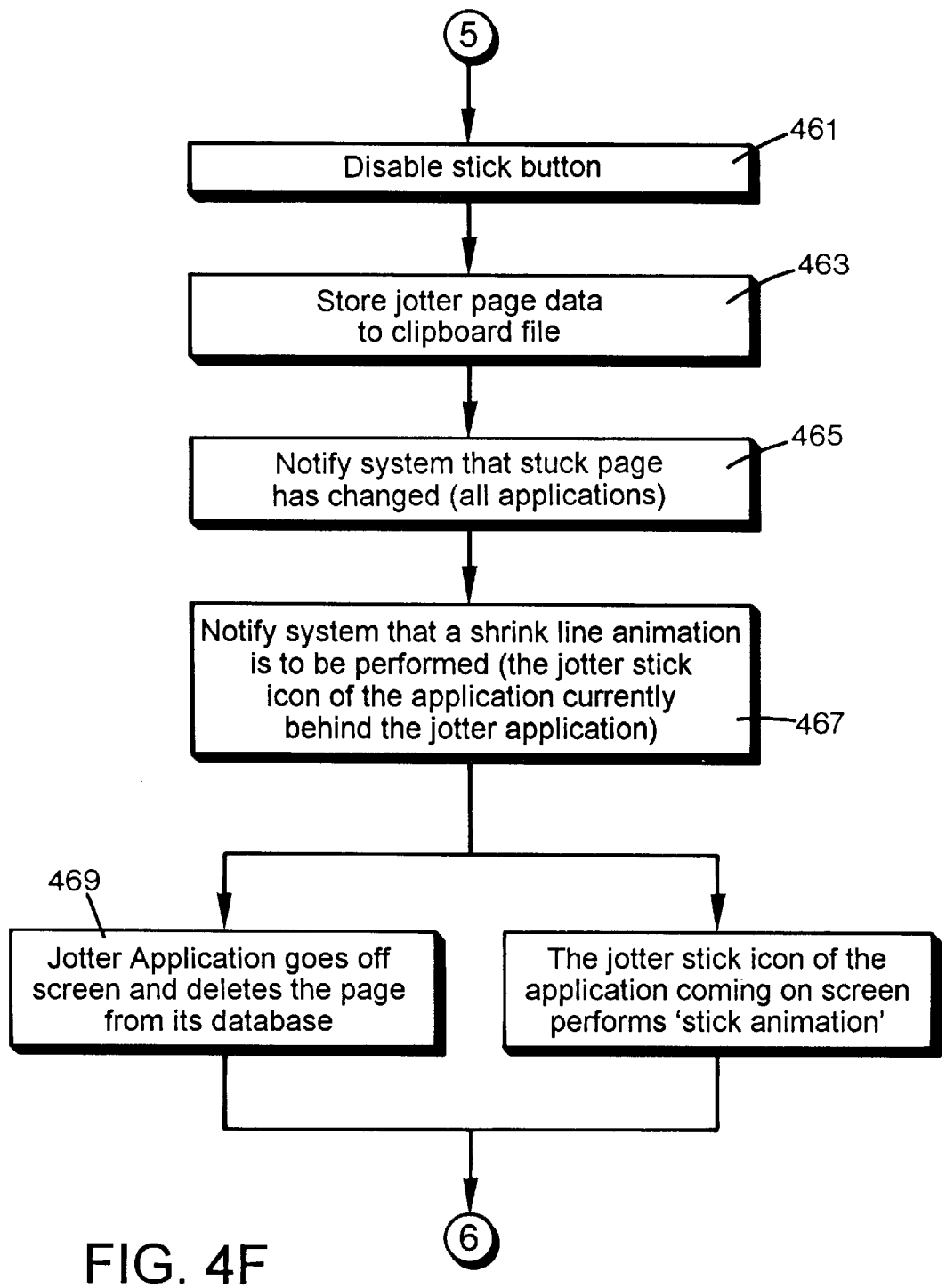
FIG. 4F is a flow chart showing the steps of a routine for the JOTTER application function key to transfer a current used page to a different application.

The F5/305, STICK, function key lies at the heart of the apparatus functionality. It provides a means of moving JOTTER entered data to another program application as shown in FIG. 4F. Each non-utility application (e.g., see icons 2–5, 7 and 8) is provided with a "Note Field" or "Table Fields" into which data can be transferred. In other words, each non-utility application is provided with a data retention capability, e.g., a Note Field in Database 5 or table items in Spreadsheet 8 (see FIG. 2), to which information can be directly transferred to or from the JOTTER application by a simple user action, namely, a "drag-and-drop" feature as it is known in the art. These type applications support the JOTTER application in that pages can be moved directly from a JOTTER page to another application's particular Note Field. In other words, the present invention provides the electronic equivalent of writing something on a small pad, tearing off the written page, and sticking the page somewhere else, e.g., in a physical file folder where the note becomes more useful.

In general, the user writes so a JOTTER application page which is saved until it is discarded, as previously described, or it is "stuck" into another application.

When the user selects to move a current used page data to another application's Note Field, the F5/305, STICK, function key is tapped, step 419. If there is no data on the current page, or if there is and the user selects the F5/305 function key, that key is disabled, step 461. The current used page data is sent to a clipboard file, step 463. The STICK function works on the entire current used page, thus it is different from other data editing such as CUT or COPY command functions. Next, all applications having a Note Field are notified that a page of data has been selected for a STICK operation, step 465. Shrink line animation—simple animation using rectangles as an outline showing the full-screen application shrinking down to a simple icon—shows the JOTTER application shrinking down to a simple icon, such as a stick, appearing on the screen, in the preferred embodiment in the title bar, e.g., to the left of the stylus mode icon 307, step 467, shown in phantom line in FIG. 3 as element 314. The JOTTER application goes off line, step 469, deleting the page now represented by the remaining shrink line icon and adjusting the page numbers of remaining used pages in accordance with the recollating of the DISCARD routine.

A non-utility application booting up displays STICK animation if that application has the capability of receiving a page in a Note Field or as a table item; if it does not, the shrink line icon 314 for the STICK page is disabled, that is, the STICK page so represented can not be dragged and dropped into that application, but the STICK page is not lost. Note that the JOTTER application does not allow the STICK page to be dropped down onto either a used or NEW page; that is, in the Jotter application itself, the shrink line icon 314 remains disabled if the JOTTER application is rebooted after STICKing a page up in the title bar as a shrink line icon 314.

Figure 5:
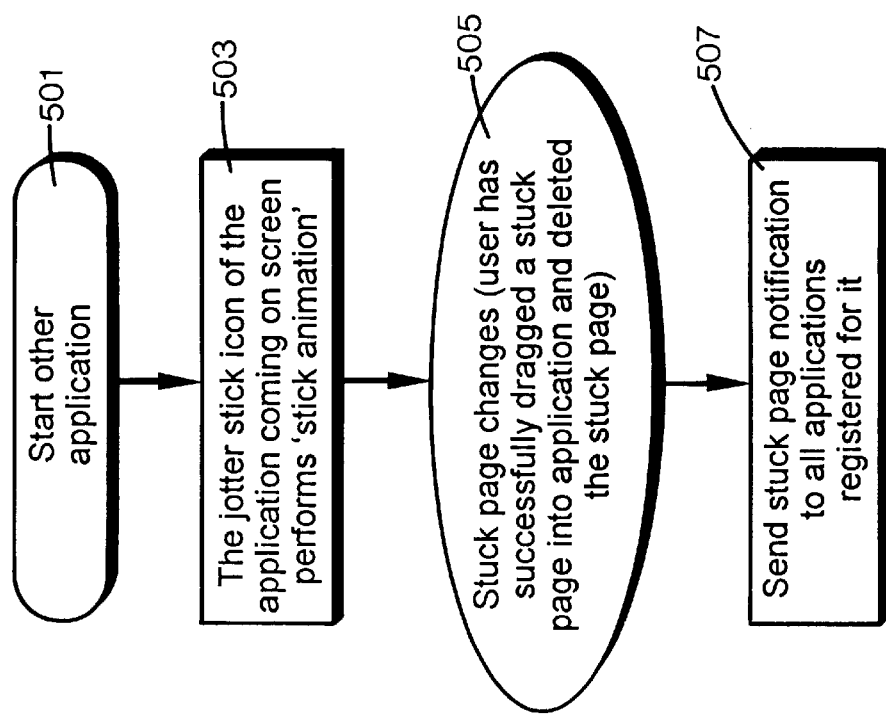
FIG. 5 is a flow chart showing the steps of a routine for starting another application capable of receiving a used page from the JOTTER application in conformance with the aspects of the present invention as shown in FIG. 4F.

The STICK page shrink line icon 314 remains in the title bar until it is dragged and dropped by the user as shown in FIG. 5 into a compatible other application. Drag-and-drop operations are well known in the computer GUI state of the art. As an example of such an operation, assume an application having a Note Field or table, such as the Appointment 2 application (FIG. 2), is booted by using the touch screen icon 2 with the stylus 104 or a dedicated key 103, step 501. The STICK page shrink line icon 314 in the title bar is enabled, step 503. After finding the date for the client meeting, the user places the tip of the stylus 104 and holds it there until a signal, such as a beep, indicates that the STICK page has been captured by the stylus 104; the user then slides the tip across the screen 109 to a valid drop area—designated by visual feedback such as changing the color of a table location where the page may be dropped in the opened application (losing contact before reaching a valid drop area cancels the drag-and-drop operation); the stylus tip is then lifted from the drop area and the STICK page is "dropped" into the application accordingly. The shrink line icon 314 then disappears from the title bar, step 505. The user now has a map and telephone number in his Appointment schedule. All other applications which were notified that a STICK page was available (see step 465) are now notified that the STICK page is gone, step 507, thus, if booted next, another application with STICK page receiving capability does not activate the STICK page animation step 503 since there is no longer a STICK page available. That is, animation only occurs once, yet each non-utility application needs to disable their STICK page icons. After a successful drag-and-drop operation, the STICK page shrink line icon 314 is removed from the title bar.

In a note formatted screen or note field of an application, dragging the STICK page shrink line icon into the data area will cause an outline box to surround the entire note data area (viz., between the title bar and the virtual function keys), providing visual feedback to the user. Dropping the icon 314 by lifting the stylus anywhere in this area appends the JOTTER STICK page data to the end of the outlined note and causes the note to update its display to show the appended data.

In a table screen, dragging the STICK page shrink line icon 314 will turn off any table selection highlighting of a currently selected table item and cause an outline box to appear around the item which the pen is over; this visual feedback outline box is the same width and height of the selection item and moves item by item as the icon 314 is dragged across the table with the stylus. Dragging an icon 314 into the bottom or top edge of a table will scroll the table item by item and the outline box will remain at its last position prior to scrolling. Dropping onto a table item appends the JOTTER data to the item's note area. Dragging outside the table's scroll areas will remove the outline box visual feedback around table items and dropping the icon, viz. lifting the stylus, cancels the drag-and-drop operation. On completion of a drag-and-drop operation, the selection highlighting is restored on the dropped item or at the last position of the outline box if the drop was canceled.

Figure 6:
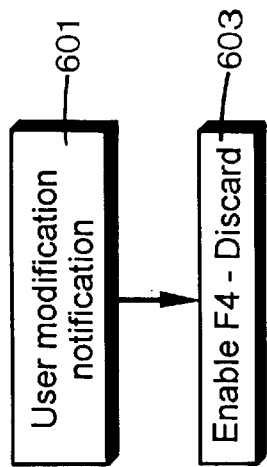
FIG. 6 is a flow chart of a routine associated with data entry in the JOTTER application as shown in FIG. 4A, element 409.
Figure 7:
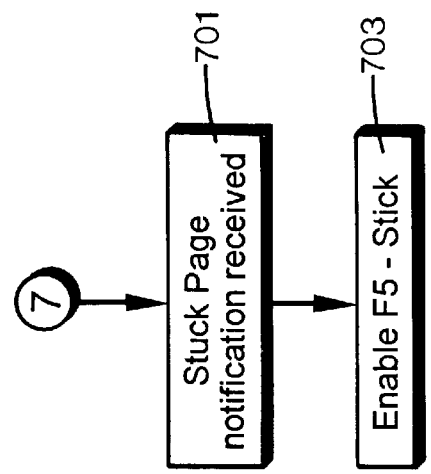
FIG. 7 is a flow chart of a routine associated with transferring a used page from the JOTTER application to another application in conformance with the aspects of the present invention as shown in FIG. 4F.

In order to support the differing function keys properly, two independent routines are provided as shown in FIGS. 6 and 7. Referring to FIG. 6, the DISCARD function key F4/304 is disabled in the NEW page mode—step 601.

Referring to FIG. 7, in conjunction with the STICK page animation as just previously described, once a STICK page shrink line icon operation has been instituted, all available applications which can receive the STICK page JOTTER data which receive notification (FIG. 5, 507), step 701, instruct enabling the STICK function key F5/305. When a notification is received by another application, shrink line animation and enabling is done. In the JOTTER application, the icon 314 is enabled and disabled depending upon if a STICK page exists; no overwrite operation is allowed.

Thus, the concept of the present invention caters to a user model of entering and organizing note-like information throughout an integrated system in a way that is intuitive and natural to the user.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application to thereby enable others skilled in the art to understand the invention for various embodiments and with various modifications as are suited to the particular use contemplated. It is intended that the scope of the invention be defined by the claims appended hereto and their equivalents.

What is claimed is:

1. A method for randomly generating information for subsequent organization in a computer by a user, the computer having a plurality of application programs and a display device with a screen, comprising the steps of:

providing at least one of the application programs with data-receiving functionality depicted as fields on the screen;

providing one of the application programs with data-capture functionality, further including the steps of:

generating, in random time and order, a plurality of computer-generated images on the screen, presenting the plurality of computer-generated images as a paginal arrangement on the screen for providing pages of display information to the user, wherein each page of display information is represented by a set of data, selecting, in random time and order, any one of the plurality of sets of data, removing the page of display information represented by the selected set of data from the paginal presentation on the screen, repaginating the presentation of the plurality of computer-generated images associated with the remaining sets of data, and providing an icon depicting the selected set of data on the screen;

correlating the icon depicting the selected set of data with a depicted field of the at least one data-receiving application program; and transferring the set of data to the depicted field of the at least one data-receiving application program.

2. The method as in claim 1, wherein the step of transferring the selected set of data further includes appending the selected set of data to the depicted field of the at least one data-receiving application program.

3. The method as in claim 1, wherein the step of providing the data-capture application program further includes closing the data-capture application program upon repaginating the presentation of the plurality of computer-generated images.

4. The method as in claim 1, further comprising the step of opening the at least one data-receiving application program prior to the step of correlating the icon depicting the selected set of data.

5. The method as in claim 2, wherein the step of transferring the selected set of data further includes deleting the icon depicting the selected set of data after appending the selected set of data to the depicted field of the at least one data-receiving application program.

6. The method as in claim 1, wherein the step of correlating the icon depicting the selected data set further includes dragging and dropping the icon to a field of the at least one data-receiving application program.

7. The method as in claim 1, wherein the step of providing the icon depicting the selected set of data further includes performing shrink line animation to provide the icon depicting the selected set of data.

8. A memory device readable by a computer tangibly embodying a plurality of application programs of instruction executable by the computer to perform method steps for randomly generating information for subsequent organization in a computer by a user, the method steps comprising:

providing at least one of the application programs with data-receiving functionality depicted as fields on the screen;

providing one of the application programs with data-capture functionality, further including the steps of:

generating, in random time and order, a plurality of computer-generated images on the screen, presenting the plurality of computer-generated images as a paginal arrangement on the screen for providing pages of display information to the user, wherein each page of display information is represented by a set of data, selecting, in random time and order, any one of the plurality of sets of data, removing the page of display information represented by the selected set of data from the paginal presentation on the screen, repaginating the presentation of the plurality of computer-generated images associated with the remaining sets of data, and providing an icon depicting the selected set of data on the screen;

correlating the icon depicting the selected set of data with a depicted field of the at least one data-receiving application program; and transferring the set of data to the depicted field of the at least one data-receiving application program.

9. The memory device as in claim 8, wherein the step of transferring the selected set of data further includes appending the selected set of data to the depicted field of the at least one data-receiving application program.

10. The memory device as in claim 8, wherein the step of providing the data-capture application program further includes closing the data-capture application program upon repaginating the presentation of the plurality of computer-generated images.

11. The memory device as in claim 8, further comprising the step of opening the at least one data-receiving application program prior to the step of correlating the icon depicting the selected set of data.

12. The memory device as in claim 9, wherein the step of transferring the selected set of data further includes deleting the icon depicting the selected set of data after appending the selected set of data to the depicted field of the at least one data-receiving application program.

13. The memory device as in claim 8, wherein the step of correlating the icon depicting the selected data set further includes dragging and dropping the icon to a field of the at least one data-receiving application program.

14. The memory device as in claim 8, wherein the step of providing the icon depicting the selected set of data further includes performing shrink line animation to provide the icon depicting the selected set of data.

15. A computing apparatus, having a central processing unit, memory, a visual feedback input-output screen, a program-instruction and data-manipulation gesturing device, a program-instruction and data-manipulation keypad device, wherein said gesturing device and said keypad device are interactive with said screen, and a plurality of application programs, the computing apparatus comprising:

means for providing at least one of the application programs with data-receiving functionality depicted as fields on the screen;

means for providing one of the application programs with data-capture functionality, further including the steps of:

means for generating, in random time and order, a plurality of computer-generated images on the screen, means for presenting the plurality of computer-generated images as a paginal arrangement on the screen for providing pages of display information to the user, wherein each page of display information is represented by a set of data, means for selecting, in random time and order, any one of the plurality of sets of data, means for removing the page of display information represented by the selected set of data from the paginal presentation on the screen, means for repaginating the presentation of the plurality of computer-generated images associated with the remaining sets of data, and means for providing an icon depicting the selected set of data on the screen;

means for correlating the icon depicting the selected set of data with a depicted field of the at least one data-receiving application program; and means for transferring the set of data to the depicted field of the at least one data-receiving application program.

16. The computing apparatus as in claim 15, wherein the means for transferring the selected set of data further includes means for appending the selected set of data to the depicted field of the at least one data-receiving application program.

17. The computing apparatus as in claim 15, wherein the means for providing the data-capture application program further includes means for closing the data-capture application program upon repaginating the presentation of the plurality of computer-generated images.

18. The computing apparatus as in claim 15, further comprising the means for opening the at least one data-receiving application program.

19. The computing apparatus as in claim 16, wherein the means for transferring the selected set of data further includes means for deleting the icon depicting the selected set of data after appending the selected set of data to the depicted field of the at least one data-receiving application program.

20. The computing apparatus as in claim 15, wherein the means for correlating the icon depicting the selected data set further includes means for dragging and dropping the icon to a field of the at least one data-receiving application program.

21. The computing apparatus as in claim 15, wherein the means for providing the icon depicting the selected set of data further includes means for performing shrink line animation to provide the icon depicting the selected set of data.

* * * * *